Feb. 19, 1952   H. R. STROHECKER   2,586,578
HEAT-TREATING RACK
Filed June 25, 1949   2 SHEETS—SHEET 1
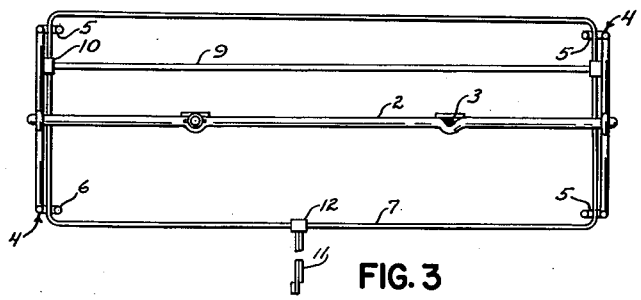
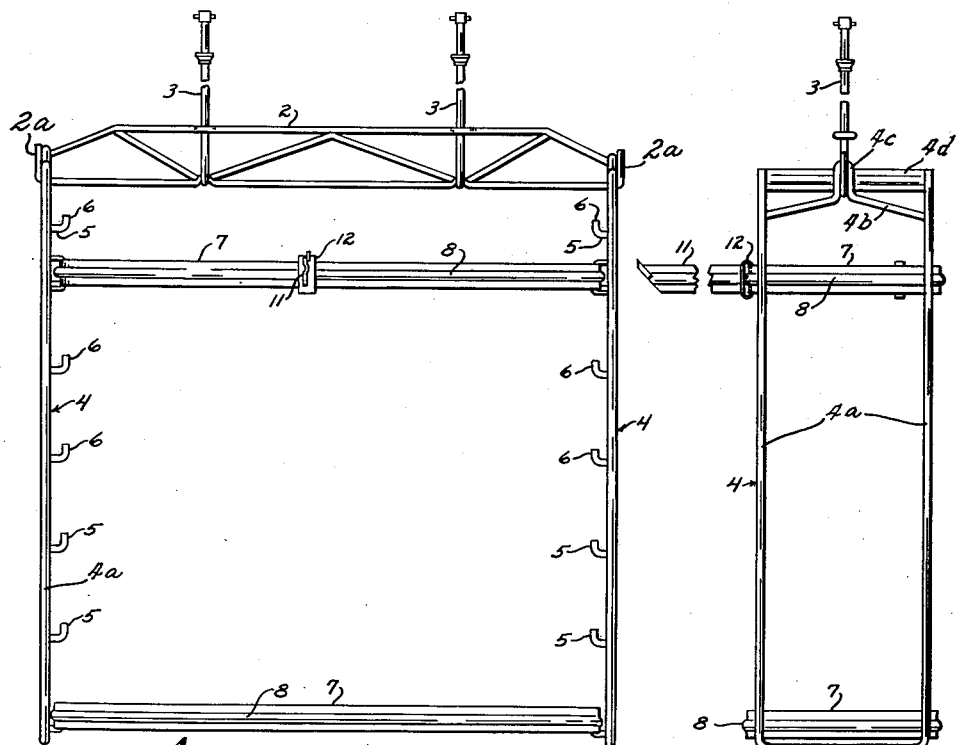
INVENTOR.
Henry Ross Strohecker
BY
Oldham & Oldham
ATTORNEYS Feb. 19, 1952  H. R. STROHECKER  2,586,578
HEAT-TREATING RACK Filed June 25, 1949  2 SHEETS—SHEET 2

INVENTOR.
Henry Ross Strohecker
BY
Oldham & Oldham
ATTORNEYS

Patented Feb. 19, 1952

2,586,578

UNITED STATES PATENT OFFICE 2,586,578

HEAT-TREATING RACK

Henry Ross Strohecker, Youngstown, Ohio

Application June 25, 1949, Serial No. 101,287

2 Claims. (Cl. 211—114)

This invention relates to heat treat fixtures, especially to a heat treat rack or fixture which is adapted to be used to support articles thereon while such articles are being subjected to high temperature. Usually the apparatus of the invention is repeatedly and intermittently subjected to differences in temperature as the rack or fixture is moved into and out of heat treating furnaces and the like.

Usually in heat treating articles, a plurality of articles are placed upon the support rack or fixture provided therefor, and these support racks are moved into and out of the heat treat chamber and, of course, are subjected to the same conditions as are the articles being processed. Thus the fixtures must be heated up to the same temperature as are the articles supported thereby and the fixtures are subjected to relatively severe conditions of corrosion, oxidation, and heat, or combinations of all three. Fixtures or other carrying racks or devices commonly used for such work at the present time have been made from castings. These castings necessarily are heavy, and are undesirable in that they do not possess the desirable mechanical characteristics of rolled or wrought material. Furthermore, the life of the cast materials, due to the repeated heating and cooling of same is relatively limited. Furthermore, the use of relatively massive, heavy cast fixtures of the class described produces a relatively low ratio of load to dead weight in the support racks, and makes it difficult to move the loaded racks and to heat same rapidly to desired temperatures. Efforts have been made to use strip or sheet metal in these carrier devices but have not completely overcome the difficulties of and objections to prior types of support devices.

The general object of the present invention is to avoid and overcome the difficulties attendant the use of previous types of racks and fixtures of the class described and to provide a novel, lightweight but sturdy support fixture of the class described which is characterized by the relative movement permitted between different portions of the support rack.

Another object of the invention is to provide a fixture for supporting articles thereon for heat treating or equivalent action wherein such fixture includes a main frame which carries a support shelf thereon with the shelf being free to move with relation to its support frame.

Yet another object of the invention is to provide a fixture support wherein support shelf portions thereof are made from rolled metal strip material which has a reinforcing corrugation provided therein and which has maximum strength with minimum weight.

Another object of the invention is to provide a low cost, light type of a support fixture of an open construction, which fixture is adapted to support a plurality of articles thereon for a heat treat or similar action.

A further object is to provide a long lived support fixture made from rolled or wrought materials which are strong and malleable.

The foregoing and other objects and advantages of the present invention will be made more apparent as the specification proceeds.

For a better understanding of the present invention, attention is directed to the accompanying drawings wherein one best known embodiment of the invention is illustrated, and wherein:

Fig. 1 is an elevation of a support fixture of the class described and embodying the principles of the invention;

Fig. 2 is a side elevation of the support of Fig. 1;

Fig. 3 is a plan of the support fixture of Fig. 1;

Figure 4:
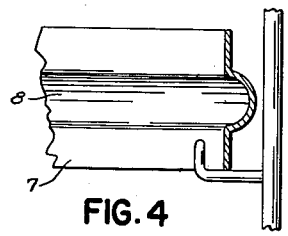
Fig. 4 is an enlarged fragmentary section showing the means used to engage a support shelf with a support frame.
Figure 5:
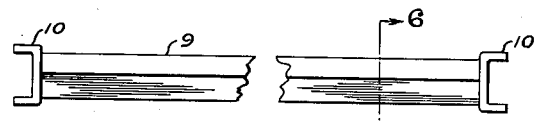
Fig. 5 is a side elevation of a cross bar used in the support fixture.
Figure 6:
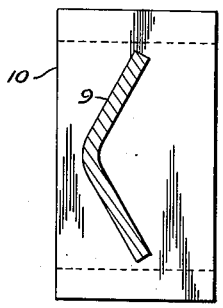
Fig. 6 is an enlarged vertical section taken on line 6—6 of Fig. 5.

With particular reference to the form of the invention illustrated in Fig. 1, the numeral I indicates generally a heat treat rack which embodies the principles of the present invention. The rack I includes a top cross frame 2 which spans the length of the rack and is preferably constructed in the form of an open truss from welded rods, as shown in Fig. 1. Cross frame 2 is supported by means of vertically extending support rods 3. Support rods 3 are adapted to be supported from an overhead conveyor (not shown) or other suitable means from which it is desired to handle the rack I. The support rod 3 may be permanently secured to the cross frame 2 by welding or other means, or the support rods 3 may be provided with hooked portions at the lower end thereof from which the cross frame 2 is suspended.

Each end of the cross frame 2 is provided with a vertically extending portion 2a forming a hook. Suspended at each end of the cross frame 2 and secured against lateral movement by the hook portions 2a are the end frames indicated generally at 4. The end frames 4 are constructed preferably from a substantially U-shaped rod portion which provides a pair of spaced vertical frame members 4a. Secured between (by welding or other means) and adjacent to the upper end of the vertically extending frame portions 4a is a supporting bracket 4b which has an inverted loop portion 4c integrally formed in the middle, intermediate the two vertical frame members 4a. The support bracket 4b is further braced by means of reinforcing plates 4d extending to either side of the portion 4c and secured to the outer spaced vertical frame members 4a. The frames 4 are suspended at either end of the cross frame 2, the loop portion 4c engaging the hook portion 2a. If desired, the end frame may be rigidly and permanently secured in position by welding the support brackets 4b in position on the cross frame 2.

As a salient feature of the present invention, both of the end frames 4 are provided with a plurality of support fingers 5 that are secured thereto, as by welding the fingers to the end frames 4. These support members or fingers 5 are secured to vertically spaced portions 4a of each of the end frames with the fingers 5 being secured in horizontal alignment on each of the end frames and with the correpsonding fingers on different end frames also being in horizontal alignment whereby the corresponding fingers on different vertical end frame portions 4a cooperate to define a support plane. Usually the support fingers 5 extend toward the corresponding support fingers formed on the opposite end frame from that carrying such support fingers. On the ends of each finger 5, upwardly turned sections 6 are provided to aid in retaining means hereinafter described which engages and is supported by the fingers 5 in association therewith.

Articles are supported on the fixture 1 primarily through the use of support shelves or racks 7. These shelves 7 are shown as being substantially rectangularly contoured and are provided with open centers since the shelves 7 are made from a rolled strip of metal with the ends of which usually being welded together to form a unitary unit. By forming the shelves 7 from rolled metal strip, it is possible to put any desired reinforcing corrugation therein, such as the corrugation 8, indicated in the drawings. Also, the use of strip in forming the shelf 7 permits load to be subjected to the strip across the width thereof which is the strongest part of the strip. The dimensions of the shelves 7 are such and correlated to the normal positioning of the end frame 4 that the shelves 7 engage with a plurality of fingers 5 and are supported on such fingers intermediate the end frames 4 and the upwardly turned sections 6 of the support fingers. In other words, the support shelf 7 will be carried by and engaged with support fingers but will be free to expand and contract with relation thereto dependent upon the temperature condition to which the support shelves are subjected at the time. Furthermore, this arrangement as shown and disclosed herein facilitates engaging the support shelves with the support fingers. It will be noted that in the drawings a pair of support shelves 7 are shown with one support shelf being positioned adjacent the bottom of the end frames 4 whereas the other support shelf may be positioned adjacent the tops of same.

Engagement of additional articles with a given support shelf 7 is facilitated by the provision of means such as a support bar 9. This support bar 9 is formed from a piece of strip metal of any desired section and is provided with channeled or U-shaped ends 10 which are adapted to engage with a support shelf 7 to be supported thereby. Thus a support bar can be positioned in the open center of a given shelf 7 at a slight angle thereto and the support bar can then be swung in an arc to engage the ends 10 with the metal strip forming the shelf 7 at opposed portions thereof. Also, a horn or hook unit 11 may be engaged with any desired shelf 7 and protrude laterally therefrom. This horn 11 is provided with a substantially C-shape engagement member, or base 12 which can be threaded into engagement with a support shelf 7. Articles to be carried by the fixed 1 may be secured thereto in any desired manner.

It will be seen that the entire top frame and end frames of the unit can be made from any desired material. Usually this is some type of a corrosion and heat resistance alloy which also is usually the type of material from which the shelves and support bars are formed. Thus high strength can be obtained with a relatively low weight. Also, by not sacrificing any strength of the fixture 1, it is possible to obtain a higher ratio of weight of load to the weight of the fixture than has heretofore been possible with cast types of racks.

Figure 7:
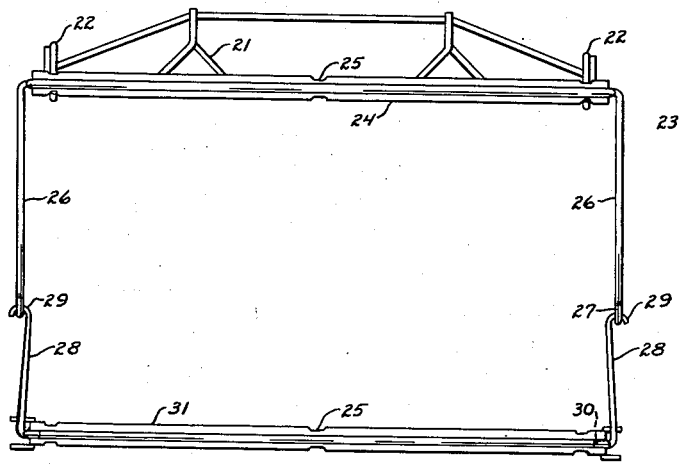
Fig. 7 is an elevation of a modification of the support fixture of the invention.
Figure 8:
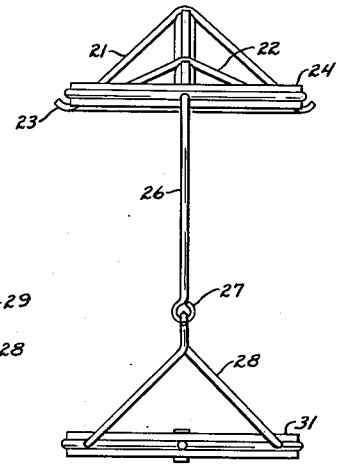
Fig. 8 is an end elevation of the fixture shown in Fig. 7.

A modification of the structure of the invention is shown in Figs. 7 and 8 and in this instance a top frame 21 is shown which is formed from a plurality of metal bars or rods which are suitably welded or otherwise secured together and which have associated therewith a plurality of transversely directed supports or braces 22. These supports 22 extend downwardly and outwardly with relation to the top frame 21 at the ends thereof and terminate in curved upturned end portions 23. These upturned end portions, or support fingers 23 of the supports 22 are positioned in a plane at the lower portion of the top frame 21 and are adapted to receive thereon removably, a support shelf 24, similar to the shelf 7, so that the shelf 24 is carried by but usually movable with relation to the ends 23. A plurality of notched portions 25 may be provided in the shelf 24 to facilitate engagement of hanger arms therewith, or to otherwise facilitate the support of articles thereon.

The top frame 21 may have, as an integral part thereof, or as members separately attached thereto, a plurality of hanger arms or end frames 26, one of which extends downwardly from each end of the top frame 21 and which terminate in eye 27 at the lower end thereof. Normally these end frames 26 are positioned in parallel relation to each other and are adapted to support thereon one or more additional support shelves similar to the shelf 24. In this instance, a hanger 28 is provided with a hook upper end 29 that is used with the eye 27 to support the hook and hanger 28 from the frame 21. This hanger 28 is provided with a pair of outwardly and downwardly extending sections which terminate in curved or hooked lower ends 30. A second shelf 31, similar to the shelf 24, is then engaged with the lower end 30 of the hanger member 28 whereby the shelf 31 is free to expand and contract with relation to its support means without disengaging itself therefrom in any manner. A support bar and horns may be associated with the fixture shown in Figs. 7 and 8.

The fixture shown in Figs. 7 and 8 is constructed, in general, from the same material and by the same method as is the embodiment of the invention shown in Fig. 1 through 6. It will be realized that the support members or fingers provided on this device of the invention may be of any suitable form and shape but that preferably such supports are adapted to retain the support shelf in positive engagement therewith but to permit relative expansion and contraction of such support shelf.

The use of the corrugated type of support shelf in the manner disclosed herein provides maximum load support strength with a minimum of fixture weight. Furthermore, the use of the rolled or wrought metal strip in forming the shelf and support frame also contributes to the strength of the fixture while retaining the weight at a minimum. Also, use of rolled strip in forming support shelves permits rounded corners to be formed on same and this enables the shelf to withstand sudden and wide temperature changes.

From the foregoing, it will be seen that a lightweight but sturdy fixture has been provided which is well adapted for supporting a plurality of articles thereon for transmission to and through high temperature zones for processing therein and wherein the fixture is repeatedly and intermittenty subjected to temperature variations of extreme degree.

While several complete embodiments of the invention have been disclosed herein, it will be appreciated that modifications of these particular embodiments of the invention may be resorted to without departing from the scope of the invention as defined by the appended claims.

Having thus described my invention, what I claim is:

1. A lightweight sturdy rack for use in high temperature operation which rack comprises an elongate top frame, means secured to said top frame for supporting same, a pair of end frames secured one at each end of the top frame and normally being in spaced parallel relation, said end frames being substantially rectangular, a plurality of support fingers secured to each of said end frames at transversely and longitudinally spaced portions thereof and at corresponding portions of said end frames, and a substantially rectangular open centered support shelf supported on said support fingers but being free for movement with relation thereto, said support shelf having rounded corners and being made of a relatively thin rolled continuous metal strip having a longitudinally extending reinforcing corrugation formed therein and with such strip being vertically positioned in said shelf.

2. A heat treat rack including a rigid truss type top frame having vertically extending hook portions adjacent the ends of the top frame, a pair of spaced end frames, said end frames having spaced vertically extending portions, a support bracket having an integrally formed inverted loop portion secured to and between the upper ends of the vertically extending portions of the end frames, said loop portion of the support brackets engaging the hook portions of the top frame for supporting the end frames in spaced relationship, a plurality of vertically spaced fingers secured to the vertical portions of the end frames, said fingers having upwardly directed ends, and a plurality of rectangular open-centered shelves supported adjacent each corner thereof by said fingers, the shelves being restrained against lateral movement by the upwardly directed ends of the fingers.

HENRY ROSS STROHECKER.

REFERENCES CITED

The following references are of record in the file of this patent:

UNITED STATES PATENTS

| Number | Name | Date |
|---|---|---|
| Re. 18,402 | Bebb | Mar. 29, 1932 |
| 327,592 | Reed | Oct. 6, 1885 |
| 464,918 | Bacon | Dec. 8, 1891 |
| 515,163 | Pauly et al. | Feb. 20, 1894 |
| 541,678 | Poindexter | June 25, 1895 |
| 810,545 | Krag | Jan. 23, 1906 |
| 894,706 | Schubert | July 28, 1908 |
| 1,603,015 | Beasley et al. | Oct. 12, 1926 |
| 1,819,472 | MacDougall | Aug. 18, 1931 |
| 1,868,091 | Brooke | July 19, 1932 |
| 1,890,897 | Bebb | Dec. 13, 1932 |
| 2,421,894 | Lee | June 10, 1947 |

FOREIGN PATENTS

| Number | Country | Date |
|---|---|---|
| 195,717 | Great Britain | Apr. 3, 1923 |